(No Model.)

J. J. ROONEY.
SECONDARY BATTERY PLATE.

No. 543,055. Patented July 23, 1895.

Witnesses:
Samuel W. Balch
Wy H. Whitman

Inventor,
John J. Rooney,
by Thomas Ewing Jr
Attorney.

UNITED STATES PATENT OFFICE.

JOHN J. ROONEY, OF BROOKLYN, NEW YORK.

SECONDARY-BATTERY PLATE.

SPECIFICATION forming part of Letters Patent No. 543,055, dated July 23, 1895.

Application filed November 19, 1894. Serial No. 529,264. (No model.)

*To all whom it may concern:*

Be it known that I, JOHN J. ROONEY, a citizen of the United States of America, residing in the city of Brooklyn, county of Kings, State of New York, have invented certain new and useful Improvements in Secondary-Battery Plates, of which the following is a specification.

Grids which are cast of lead or lead alloy deteriorate when exposed to electrolytic action or strong acids. This causes them to bend or buckle and the active material to fall out of the pockets in which it is usually packed, making bad contact between the material and grid and often short-circuiting the cell. I seek to dispense with the use of grids cast of lead or lead alloy, and to produce a secondary-battery electrode in which active material is supported on a grid combining lightness with strength and good electric conductivity, and on which the active material shall be held securely in place and good contact maintained in spite of jarring or sudden and heavy discharges. To this end I have devised a composite grid made up of a base plate and combined confining and coating plates of rolled metal.

Figure 1:
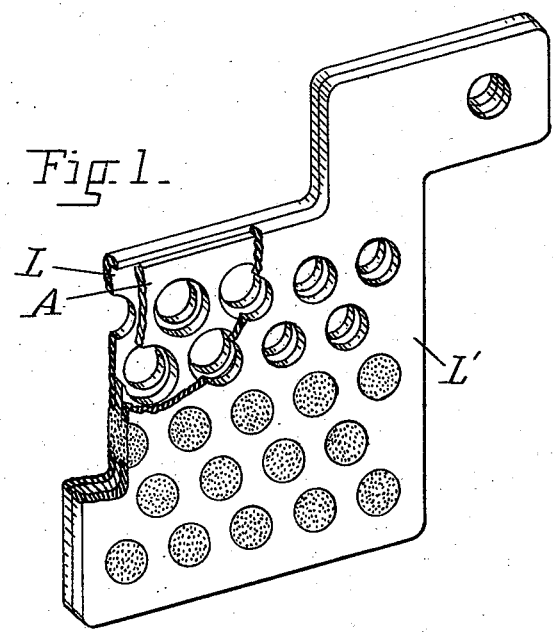
Figure 2:
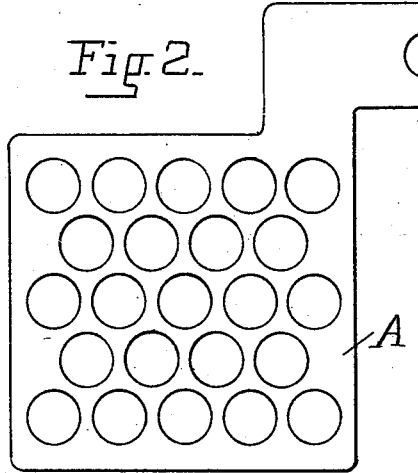
Figure 3:
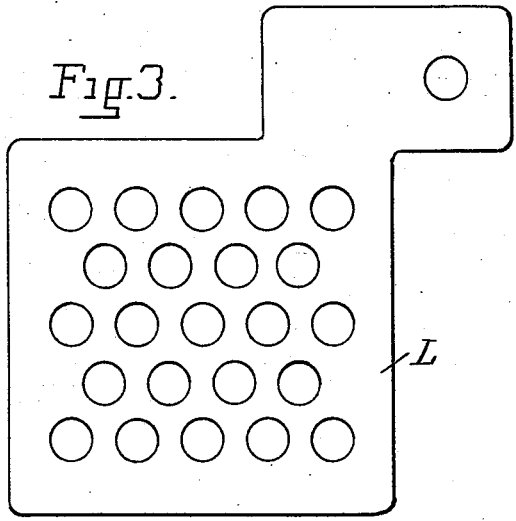

In the accompanying sheet of drawings, which forms a part of this specification, Figure 1 shows one of my grids complete with a portion of the active material applied and the grid partly broken away. Fig. 2 shows a base plate, and Fig. 3 shows a single lead sheet which is a combined confining and coating plate.

I prepare a grid by taking, first, a rigid base-plate of aluminum or other metal cut from sheet metal and puncture it with numerous perforations, preferably symmetrically disposed. The confining and coating plates, which I shall hereinafter call "coating-plate," rolled from pure lead or an unoxidizable lead alloy, are punched with perforations smaller in size than the perforations in the base-plate and so disposed as to register preferably concentrically with these in the completed grid. The coating-plates are of somewhat larger superficial area than the base-plate. This will be seen by reference to Figs. 2 and 3. I then put the three plates together in the manner illustrated in Fig. 1, with the base-plate A between the coating-plates L and L', and fold the edges of the coating-plates over the edge of the base-plate. On putting the plates together I interpose between the base-plate and each coating-plate a very thin sheet of some suitable solder, or prepare it for soldering in any other suitable manner, as by dipping in molten solder, and if the base-plate is of some metal which is difficult to solder it can be coated by the ordinary process of dipping, or in any well known manner, with a thin film of some metal which will stick to it and to the solder. Any suitable material can be employed for this film. I recommend lead or tin. The plates of the grid are then heated to melt the solder under pressure. The heating necessary for soldering can be conveniently supplied from heated iron or copper blocks between which the grid is pressed. The superfluous solder will run over and protect the exposed parts at the perforations of the base-plate. The grid formed by uniting the plates has openings through it and pockets surrounding the openings. These pockets result from the fact that the perforations in the base-plate are larger than those in the coating-plates. After the grid is thus made up the openings through the grid and the pockets which surround them are packed with a suitable active material, or material to become active, in the form of a paste, paint, or cement, such as is used in the ordinary Faure secondary-battery electrode, or in the form of a powder, or of tablets of fused salt of lead, as lead chloride, or in any other suitable form. The active material is locked in place by the pockets, thus insuring stability and good electrical contact. This construction is useful on both plates, but particularly on the positive plate, where the expansion which takes place is apt to cause the material to fall off. This the pockets prevent. In making up an electrode using tablets of lead chloride these can be set in the base plate, and the parts then all assembled and pressed together between heated blocks to effect the soldering. This avoids the necessity of casting the plates around the tablets. The lead chloride is afterward transformed into spongy lead and then charged, as is well understood.

What I claim, and desire to secure by Letters Patent of the United States, is—

1. A composite grid consisting of a perforated base plate and perforated coating plates, the perforations in the coating plates being smaller than those in the base plate, and the plates being united with their perforations registering concentrically so as to form openings through the grid and pockets surrounding the openings, substantially as described.

2. A secondary battery electrode consisting of a perforated base plate and perforated coating plates, the perforations in the coating plates being smaller than those in the base plate, the plates being united with their perforations registering concentrically to form a grid having openings therethrough and pockets surrounding the openings, and active material or material to become active packed in the pockets and openings of the grid, substantially as described.

Signed by me, in New York city, this 17th day of November, 1894.

JOHN J. ROONEY.

Witnesses:
THOMAS EWING, Jr.,
SAMUEL W. BALCH.